US007584894B2

(12) United States Patent
Zou et al.

(10) Patent No.: US 7,584,894 B2

(45) Date of Patent: Sep. 8, 2009

(54) HOUSING MECHANISM FOR RECEIVING MEMORY CARD

(75) Inventors: Zhou-Quan Zou, Shenzhen (CN); Chia-Hua Chen, Tucheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 569 days.

(21) Appl. No.: 11/307,724

(22) Filed: Feb. 18, 2006

(65) Prior Publication Data

US 2006/0204391 A1 Sep. 14, 2006

(30) Foreign Application Priority Data

Mar. 11, 2005 (CN) ........................ 2005 2 0055755

(51) Int. Cl.
*G06K 7/00* (2006.01)

(52) U.S. Cl. ....................... 235/487; 235/449; 235/482; 235/492; 235/493; 439/325; 439/630; 360/2

(58) Field of Classification Search ................. 235/449, 235/482, 492, 493; 439/325, 630; 360/2
See application file for complete search history.

(56) References Cited

U.S. PATENT DOCUMENTS

| | | | | |
|---|---|---|---|---|
| 2003/0043485 | A1* | 3/2003 | Conner et al. | 360/2 |
| 2003/0218105 | A1* | 11/2003 | Sones et al. | 248/104 |
| 2004/0079805 | A1* | 4/2004 | Nagata et al. | 235/482 |
| 2004/0110423 | A1* | 6/2004 | Shishikura et al. | 439/630 |
| 2005/0142913 | A1* | 6/2005 | Cheng | 439/159 |
| 2006/0171074 | A1* | 8/2006 | Wagner et al. | 360/133 |

* cited by examiner

*Primary Examiner*—Allyson N Trail
(74) *Attorney, Agent, or Firm*—Steven M. Reiss

(57) ABSTRACT

A housing mechanism includes a housing, a defending element, and a magnetic unit. The housing has a cavity, and an opening defined in a sidewall of the housing. The opening communicates with the cavity. The defending element is rotatably attached to an inner side of the sidewall adjacent the opening. The magnetic unit is fixed adjacent to the opening and configured for causing the defending element to return to cover the opening by a magnetic force produced by the magnetic unit.

18 Claims, 5 Drawing Sheets

HOUSING MECHANISM FOR RECEIVING MEMORY CARD

FIELD OF THE INVENTION

The present invention generally relates to housing mechanisms and, more particularly, to a housing mechanism for receiving a memory card used in a portable electronic device.

DESCRIPTION OF RELATED ART

With the development of information processing technology, portable electronic devices such as digital cameras, mp3 players, video cameras, mobile phones, and personal digital assistants (PDAs) are now in widespread use. The memory card is an important element to store datum and applications in such portable electronic devices.

The memory card is typically pluggably fixed in a housing of the electronic device. One end of the memory card has a first electronic interface element. The housing of the electronic device has an opening in one sidewall thereof. A second electronic interface element is provided at a bottom of the opening. When the memory card is used, the first electronic interface element is inserted into the opening of the housing of the electronic device with the first electronic interface element engaging with the second electronic interface element of the electronic device. This enables it to conveniently to transfer data to various electronic devices. However, when no memory card is connected to the electronic device, the second electronic interface element of the electronic device is liable to become clogged or obstructed with dust. Consequently the performance of the second electronic interface element is liable to be damaged.

Therefore, a new housing mechanism for receiving a memory card is desired in order to overcome the above-described shortcoming.

SUMMARY OF INVENTION

In one embodiment thereof, a housing mechanism includes a housing, a defending element and a magnetic unit. The housing has a cavity, and an opening defined in a sidewall of the housing. The opening communicates with the cavity. The defending element is rotatably attached to an inner side of the sidewall adjacent the opening. The magnetic unit is fixed adjacent to the opening and configured for causing the defending element to return to cover the opening by a magnetic force produced by the magnetic unit.

Other advantages and novel features of the embodiments will become more apparent from the following detailed description thereof when taken in conjunction with the accompanying drawings.

BRIEF DESCRIPTION OF DRAWINGS

Many aspects of the housing mechanism can be better understood with reference to the following drawings. The components in the drawings are not necessarily to scale, the emphasis instead being placed upon clearly illustrating the principles of the present housing mechanism. Moreover, in the drawings, like reference numerals designate corresponding parts throughout the several views.

DETAILED DESCRIPTION

The present housing mechanism is suitable for portable electronic devices such as digital cameras, mp3 players, video cameras, mobile phones, PDAs, and so on.

Figure 1:
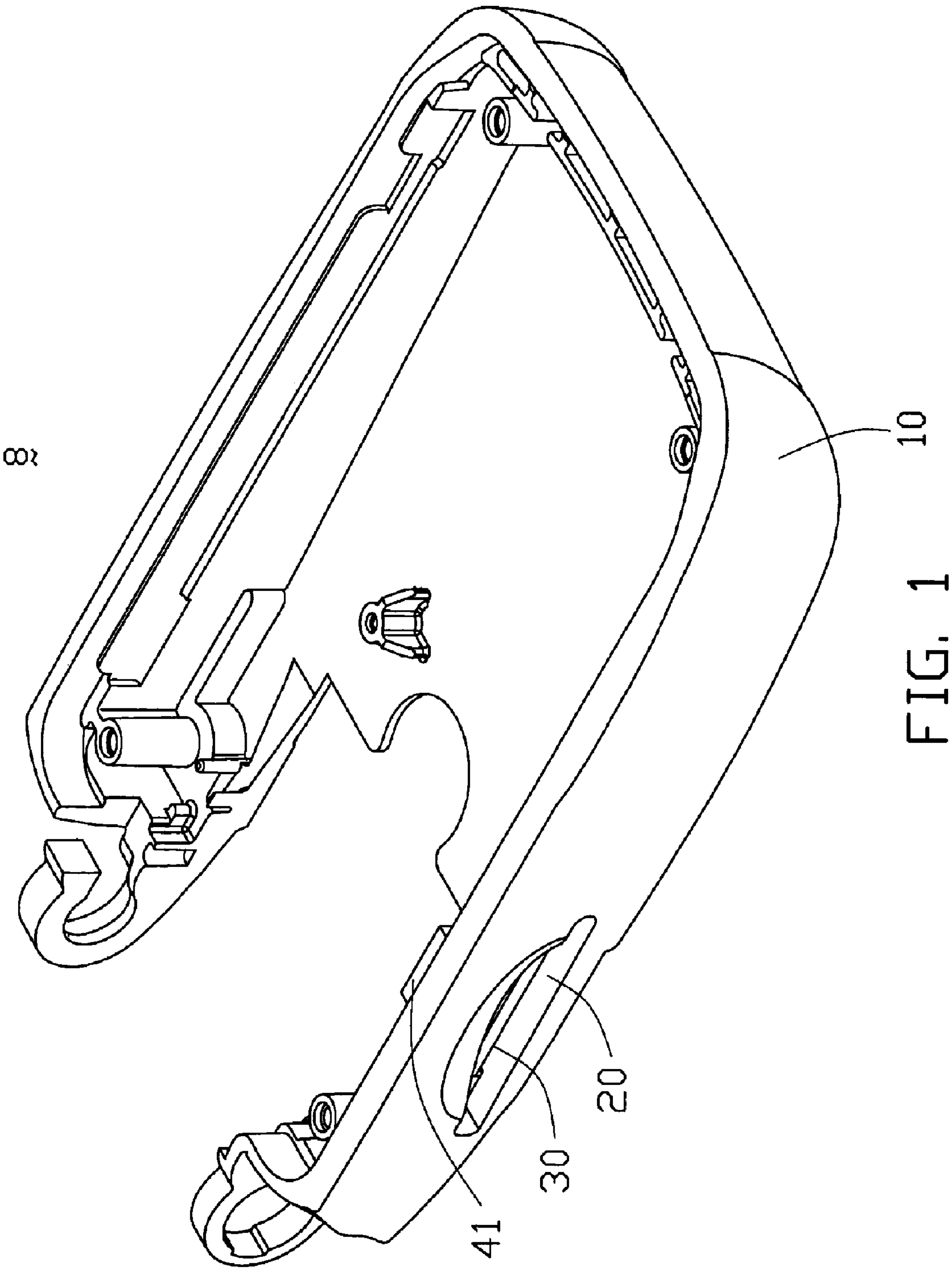
FIG. 1 is an assembled, isometric view of a housing mechanism, in accordance with a preferred embodiment.
Figure 2:
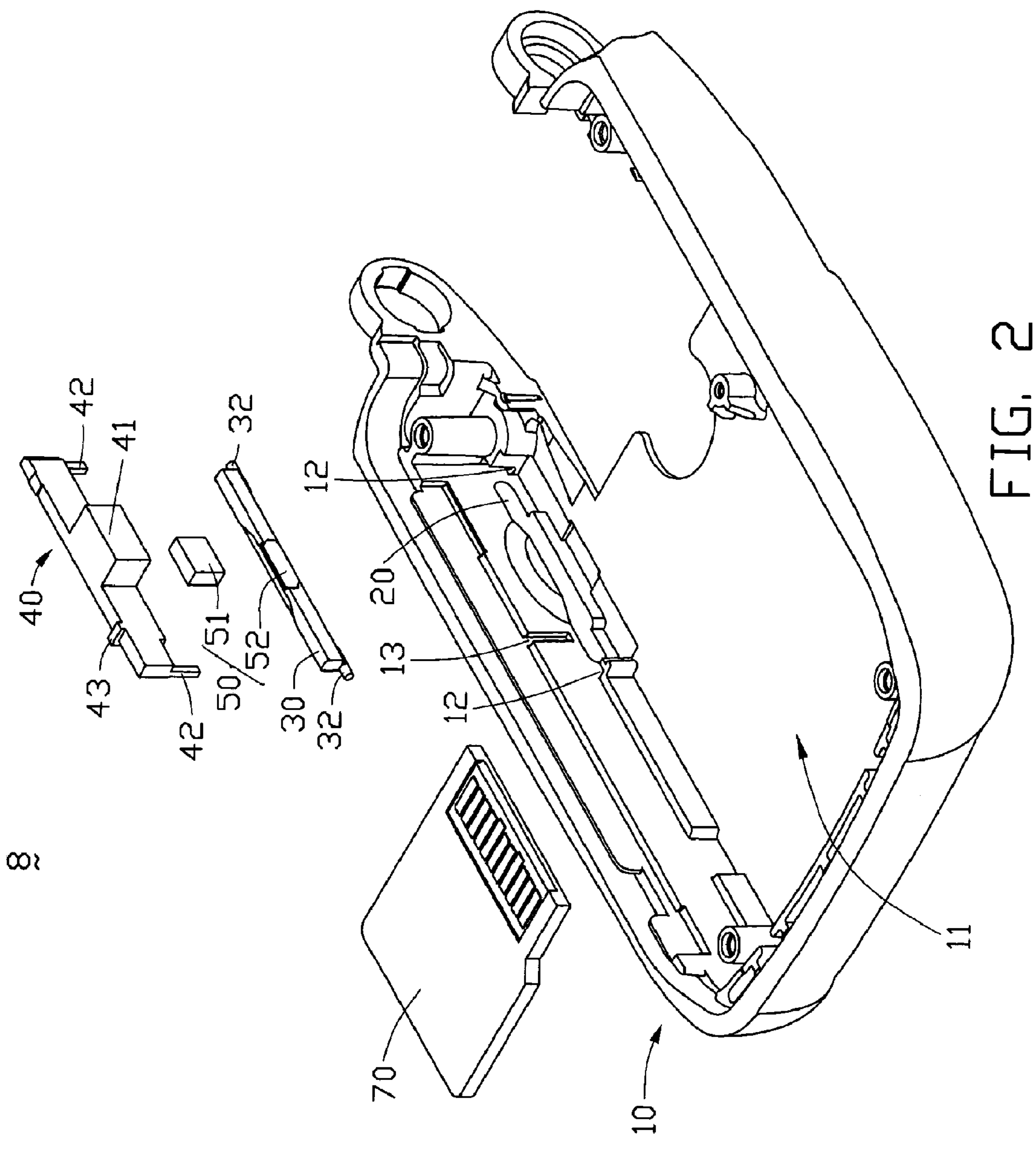
FIG. 2 is an exploded, isometric view of the housing mechanism shown in FIG. 1, together with a memory card.

Referring now to the drawings in detail, FIG. 2 shows a housing mechanism 8 used with a memory card 70 according to a preferred embodiment of the present invention. Also referring to FIGS. 1 and 4, the housing mechanism 8 includes a housing 10, an opening 20, a defending element 30, a locking element 40 and a magnetic unit 50.

The housing 10 is substantially in the form of a rectangular block. A cavity 11 is defined in a center portion of the housing 10. The cavity 11 is used to accommodate some electronic elements, such as a printed circuit board, therein, when the housing 10 is assembled with other housings of a portable electronic device. The opening 20 is defined through one sidewall of the housing 10, and communicates with the cavity 11. The opening 20 is substantially rectangular. Two receiving holes 12 are respectively defined in the housing 10 adjacent to two ends of the opening 20. The receiving hole 12 is substantially a rectangular recess. A latching groove 13 is defined in the sidewall of the housing 10 and above the opening 20.

Figure 3:
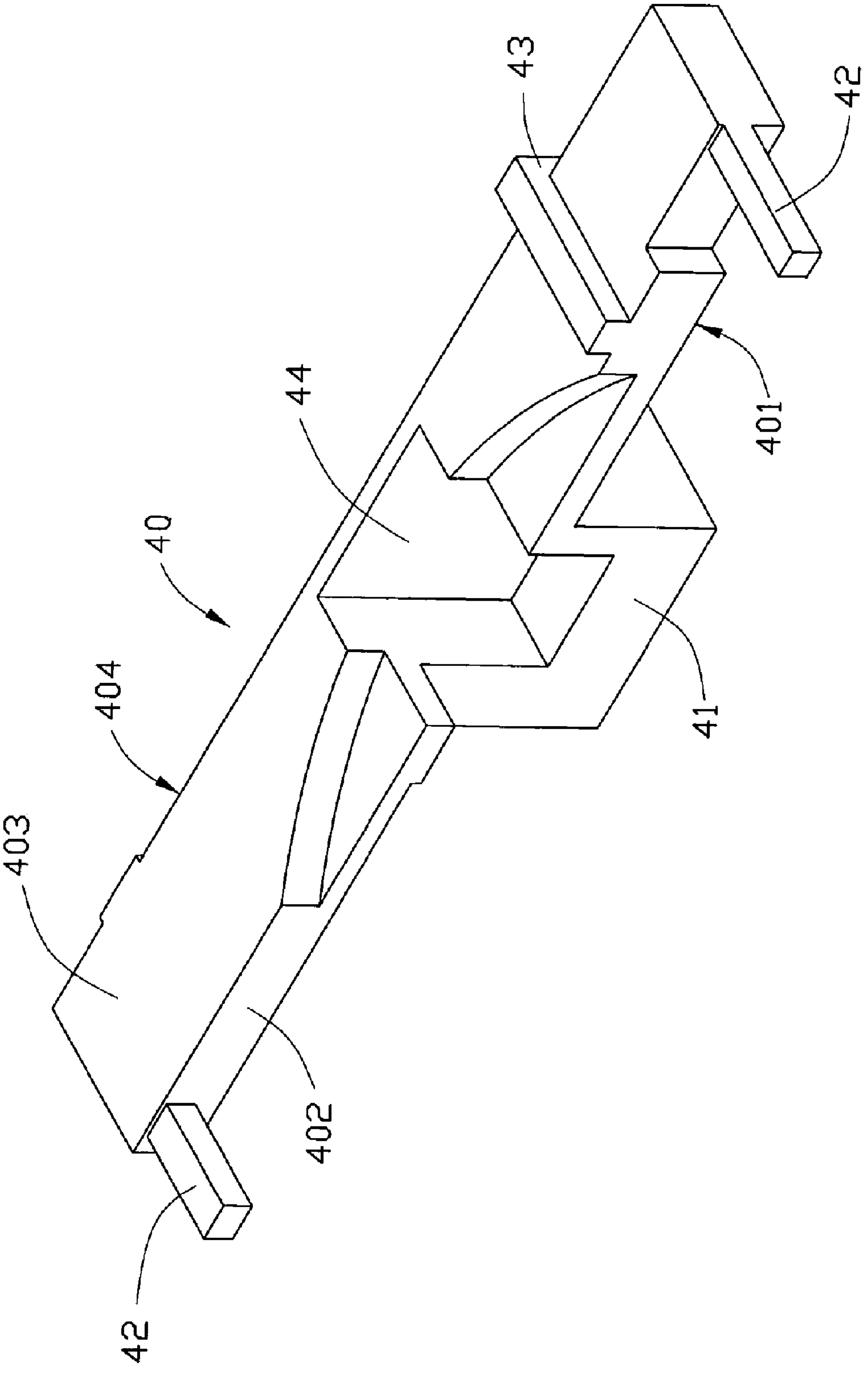
FIG. 3 is an enlarged, isometric view of a defending element of the housing mechanism shown in FIG. 2.
Figure 4:
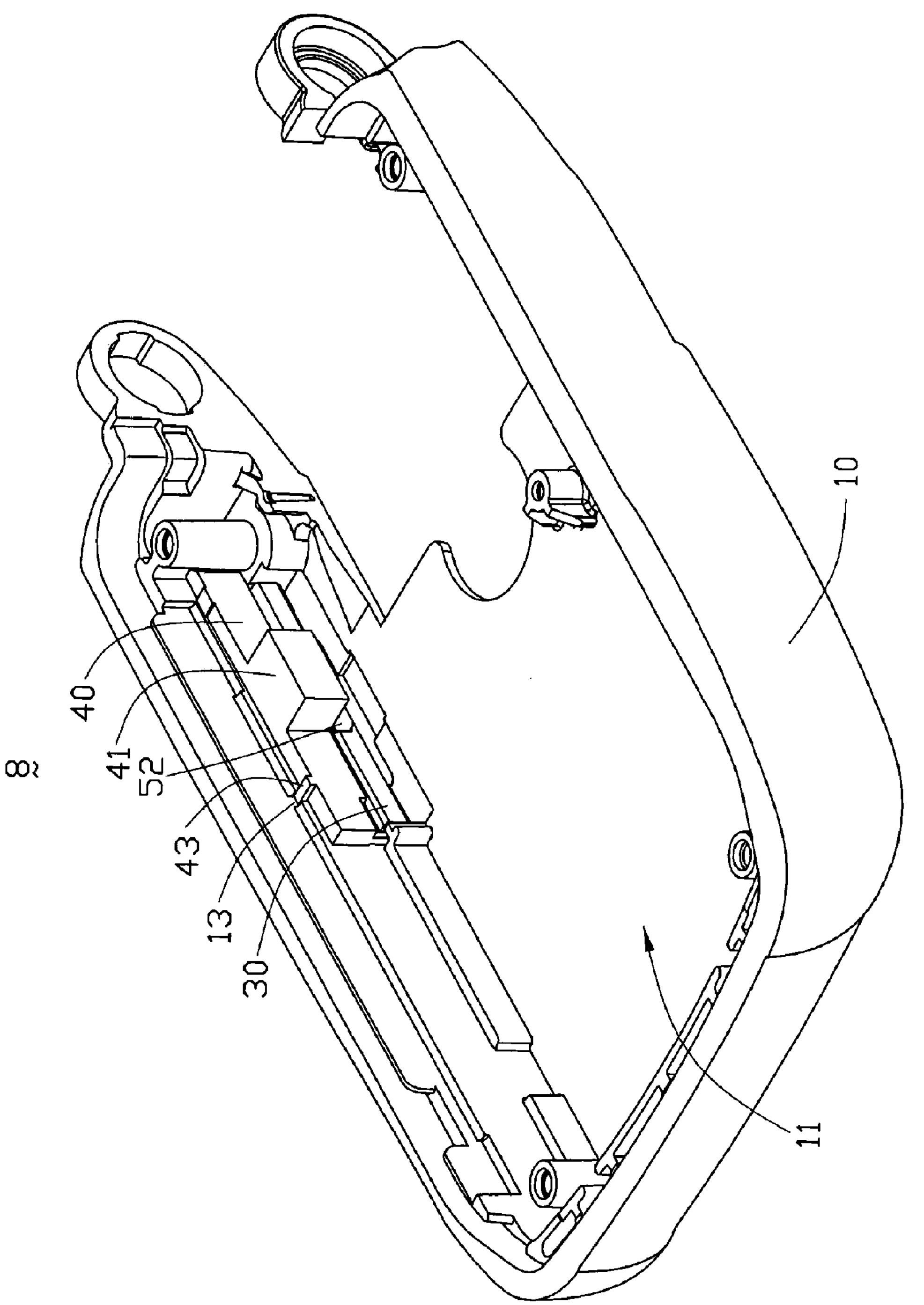
FIG. 4 is similar to FIG. 1, but viewed from another aspect.

Referring to FIGS. 2 through 4, the defending element 30 is substantially a rectangular solid, and includes two shafts 32 respectively extending from two opposite side surfaces thereof. The section size of the defending element 30 is larger or equal to that of the opening 20. The two shafts 32 are mounted into the two receiving holes 12, and can be rotated in the two receiving holes 12, respectively. Therefore, the defending element 30 can be rotatable relative to the housing 10.

The locking element 40 has a first surface 401, a second surface 402 adjacent to the first surface 401, a third surface 403 opposite to the first surface 401, and a fourth surface 404 opposite to the second surface 402. The locking element 40 includes a block 41, two locking rods 42, a locking projection 43, and a receiving groove 44. The block 41 is formed at a substantially central portion of the first surface 401 of the locking element 40. The receiving groove 44 is defined in the block 41. The two locking rods 42 respectively extend from two ends of the second surface 402 of the locking element 40, perpendicular to the second surface 402. The locking projection 43 protrudes from the third surface 403 and extends to the fourth surface 404 of the locking element 40, and parallel to the block 41.

The two locking rods 42 are also respectively mounted into the two receiving holes 12 of the housing 10, and presses against the two shafts 32 of the defending element 30, so as to avoid the defending element 30 being pushed out of the housing 10. The locking projection 43 of the locking element 40 can be engaged with the latching groove 13 of the housing 10, thereby the locking element 40 can be attached to the housing 10, facing the defending element 30.

The magnetic unit 50 includes a magnet 51 and a magnetic metal 52 such as iron. The magnetic metal 52 is fixed in a substantially central portion of the defending element 30. The magnet 51 is fixed in the receiving groove 44 of the locking element 40, and faces the magnetic metal 52.

When no memory card 70 is fixed with the housing mechanism 8, the defending element 30 is kept in a close state and covers the opening 20 as the magnet 51 attracts the magnetic metal 52 upward. Thus moving the defending element 30 into a closed position. Therefore, electronic elements in the portable electronic device cannot become obstructed by dust.

Figure 5:
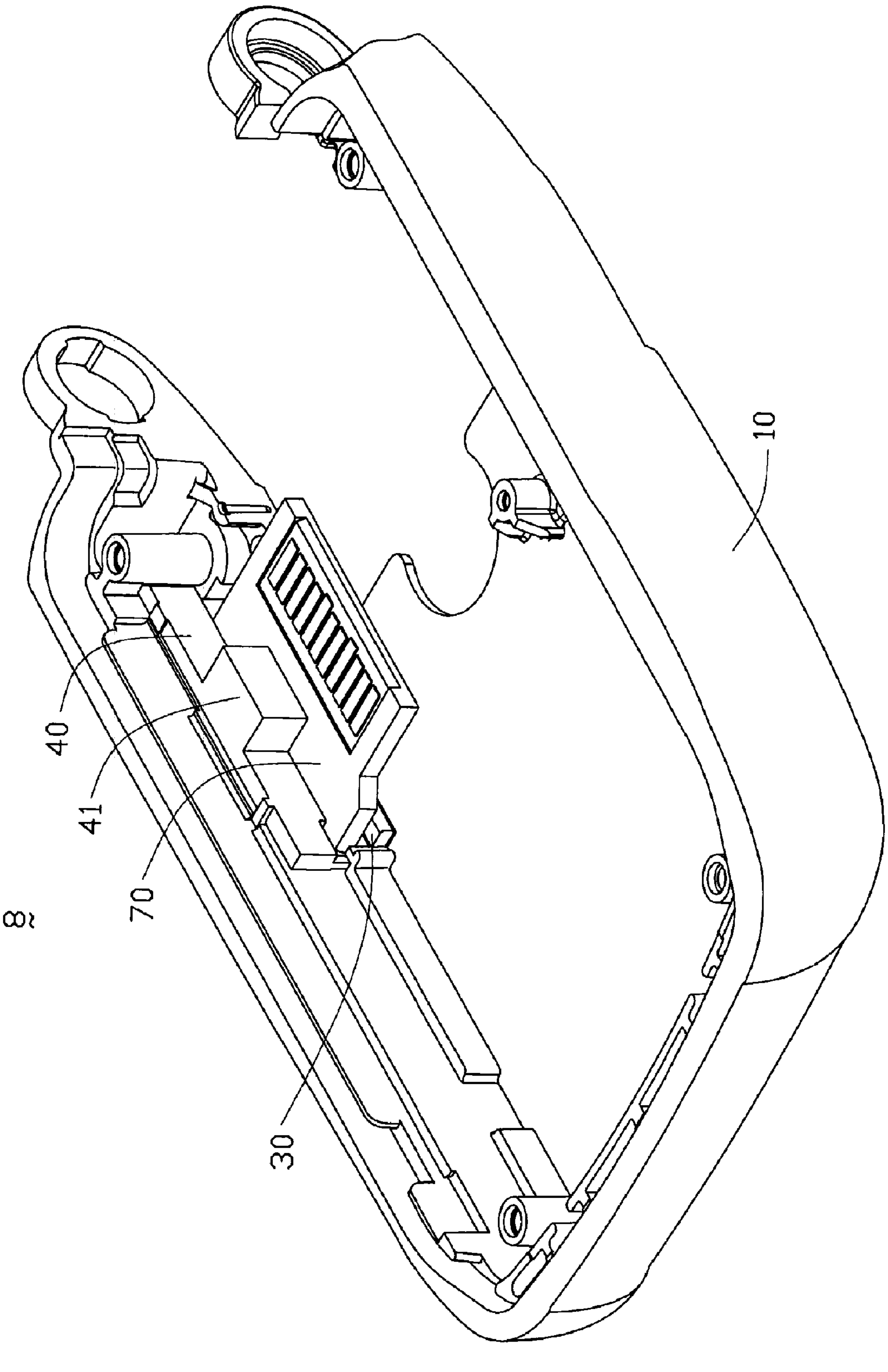
FIG. 5 is an isometric view of the housing mechanism used with the memory card of FIG. 4.

Referring to FIG. 5, when the memory card 70 is fixed to the housing mechanism 8, one end of the memory card 70 is inserted into the opening 20 by a user. When the memory card 70 travels through the opening 20, the defending element 30 is pushed open. The memory card 70 moves into the cavity 11 of the housing 10. The defending element 30 keeps this open state until the memory card 70 is pulled out of the housing mechanism 8. When the memory card 70 is pulled out of the housing mechanism 8, the defending element 30 rotates back to cover the opening 20 due to the attraction of the magnet 51.

In alternative embodiments, positions of the locking projection 43 and the latching groove 13 are interchangeable. Accordingly, the locking projection 43 can be defined in the sidewall of the housing 10 and above the opening 20, the latching groove 13 can be defined in the locking element 40. Therefore, the locking element 40 can also be attached to the housing 10.

In the embodiment, a first locking member, i.e. the locking element 40 and a magnet 51 fixed in the receiving groove 44 of the locking element, can be located adjacent to the opening 20. A second locking member, i.e. the magnetic metal 52, can be attached to the defending element 30. The first and second locking members magnetically cooperate with each other so as to load the defending element toward the closed state.

In further alternative embodiments, positions of the magnet 51 and the magnetic metal 52 are also interchangeable. Accordingly, the magnet 51 can be fixed in the defending element 30, and the magnetic metal 52 can be fixed in the receiving groove 44 of the locking element 40. In addition, it is to be understood that the magnetic metal 52 can be replaced with another magnet having a different magnetic pole from that of the magnet 51.

It is to be understood that the magnet 51 can be directly fixed at the housing 10 so that it causes the defending element 30 to return to cover the opening 20. In addition, the defending element 30 can be configured to connect with the housing by other means, as long as the defending element 30 is movable relative to the housing 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing mechanism comprising:

a housing having a cavity, the housing having a sidewall defining an opening therethrough, the opening communicating with the cavity;

a defending element rotatably attached to an inner side of the sidewall at one side of the opening;

a magnetic unit including two magnets, one of the two magnets being fixed on the defending element, another one being positioned at another side of the opening, facing the defending element, the defending element covering the opening by a magnetic force produced by the two magnets.

2. The housing mechanism as claimed in claim 1, further comprising a locking element secured in the housing, wherein the locking element faces the defending element, and the another one of the two magnets is fixed in the locking element.

3. The housing mechanism as claimed in claim 2, wherein the locking element has a first surface, a second surface joining to the first surface, a third surface opposite to the first surface and a fourth surface opposite to the second surface, and the locking element includes a block formed at the first surface thereof, and a locking projection protruding from the third surface and extending to the fourth surface of the locking element, and parallel to the block.

4. The housing mechanism as claimed in claim 3, wherein a latching groove is defined in the sidewall, and the locking element is attached to the housing by the locking projection thereof being engaging with the latching groove.

5. The housing mechanism as claimed in claim 2, wherein one of the two magnets is a magnetic metal.

6. The housing mechanism as claimed in claim 2, wherein the two magnets having opposite magnetic poles facing each other.

7. The housing mechanism as claimed in claim 2, wherein the locking element defines a receiving groove receiving at least a part of another one of the two magnets.

8. The housing mechanism as claimed in claim 1, wherein the housing has two receiving holes defined therein, adjacent to two opposite ends of the opening respectively.

9. The housing mechanism as claimed in claim 8, wherein the defending element is substantially a rectangular solid, and includes two shafts respectively extending from two opposite side surfaces thereof, the two shafts are respectively mounted into the two receiving holes, and rotated in the two receiving holes, thereby the defending element is rotatable relative to the housing.

10. The housing mechanism as claimed in claim 2, wherein the locking element comprises two locking rods respectively extending from two opposite ends of one surface of the locking element, the housing has two receiving holes defined adjacent to two ends of the opening, and the defending element has two shafts extending from two opposite side surfaces, the two locking rods are respectively mounted into the two receiving holes, and pressed against the two shafts of the defending element, whereby the defending element can avoid being pushed out of the housing.

11. The housing mechanism as claimed in claim 1, wherein a section size of the defending element is larger than or equal to that of the opening.

12. A housing mechanism for an electronic device, comprising:

a housing including a sidewall defining an opening therethrough;

a first locking member located at one side of the opening;

a defending element attached to an inner side of the sidewall at another side of the opening, facing the first locking member, the defending element being movable between a closed state where the defending element covers the opening, and an open state where the defending element uncovers the opening; and a second locking member attached to the defending element, the first and second locking members magnetically cooperating with each other so as to bias the defending element toward the closed state.

13. The housing mechanism as claimed in claim 12, wherein one of the first locking member and the second locking member is a magnet, and the other one of the first locking member and the second locking member is a magnetic metal.

14. The housing mechanism as claimed in claim 13, further comprising a locking element secured in the housing, wherein the first locking member is fixed in the locking element.

15. The housing mechanism as claimed in claim 14, wherein the locking element has a first surface, a second surface joining to the first surface, a third surface opposite to the first surface and a fourth surface opposite to the second surface, and the locking element includes a block formed at the first surface thereof, a receiving groove defined in the block and a locking projection protruding from the third surface and extending to the fourth surface of the locking element, and parallel to the block, one of the first locking member and the second locking member is fixed in the receiving groove.

16. The housing mechanism as claimed in claim 15, wherein a latching groove is defined in the sidewall, and the locking element is attached to the housing by the locking projection thereof being engaging with the latching groove, and the locking element faces the defending element.

17. The housing mechanism as claimed in claim 14, wherein the locking element further comprises two locking rods respectively extending from two ends of one surface thereof, the housing has two receiving holes defined adjacent to two ends of the opening, and the defending element has two shafts extending from two opposite side surfaces into the receiving holes, respectively, the two locking rods are respectively mounted into the two receiving holes, and pressed against the two shafts of the defending element, thus avoiding the defending element being pushed out of the housing.

18. The housing mechanism as claimed in claim 12, wherein the housing has two receiving holes defined therein, adjacent to two opposite ends of the opening respectively, the defending element is substantially a rectangular solid, and includes two shafts respectively extending from two opposite side surfaces thereof, the two shafts are respectively mounted into the two receiving holes, and rotated in the two receiving holes, whereby the defending element is rotatable relative to the housing.

* * * * *

UNITED STATES PATENT AND TRADEMARK OFFICE

CERTIFICATE OF CORRECTION

PATENT NO. : 7,584,894 B2
APPLICATION NO. : 11/307724
DATED : September 8, 2009
INVENTOR(S) : Zou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this

Fourteenth Day of September, 2010

David J. Kappos

*Director of the United States Patent and Trademark Office*